June 22, 1937.  B. J. ANDERSON  2,084,374
REAR FRAME MEMBER
Filed May 22, 1935  2 Sheets-Sheet 1
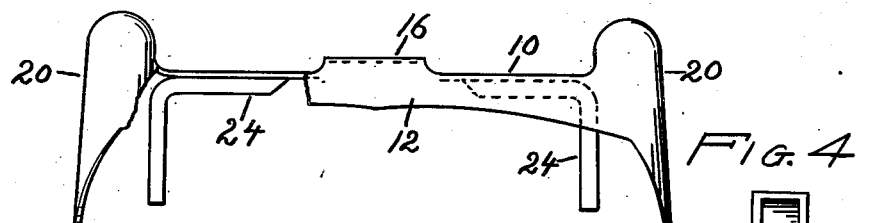
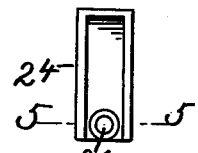
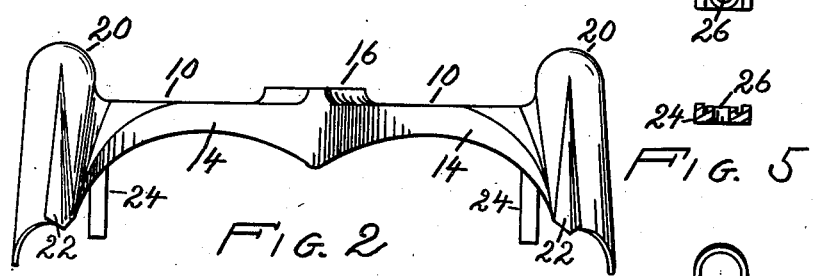
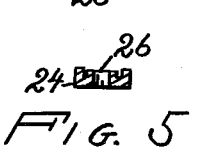
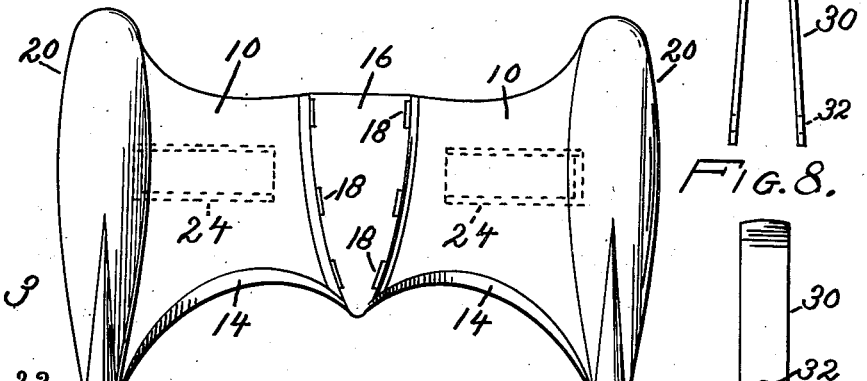
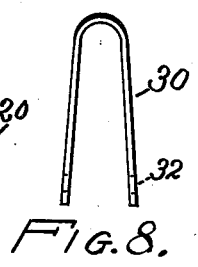
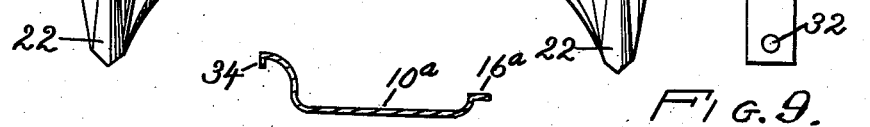
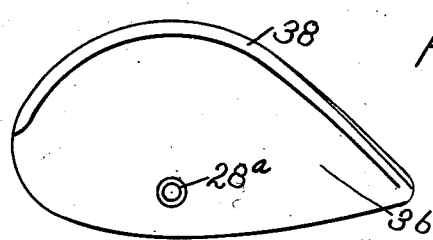
BERT J. ANDERSON
INVENTOR
BY Leon T. Hooper
ATTORNEY June 22, 1937.  B. J. ANDERSON  2,084,374
REAR FRAME MEMBER
Filed May 22, 1935  2 Sheets-Sheet 2
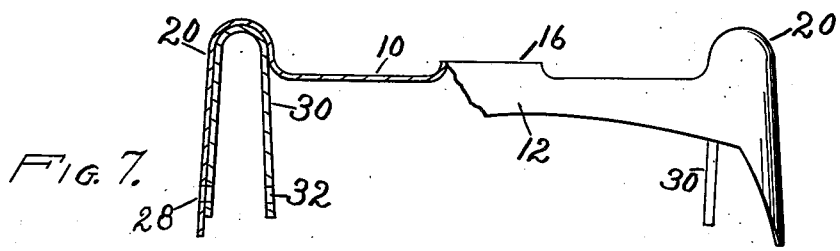
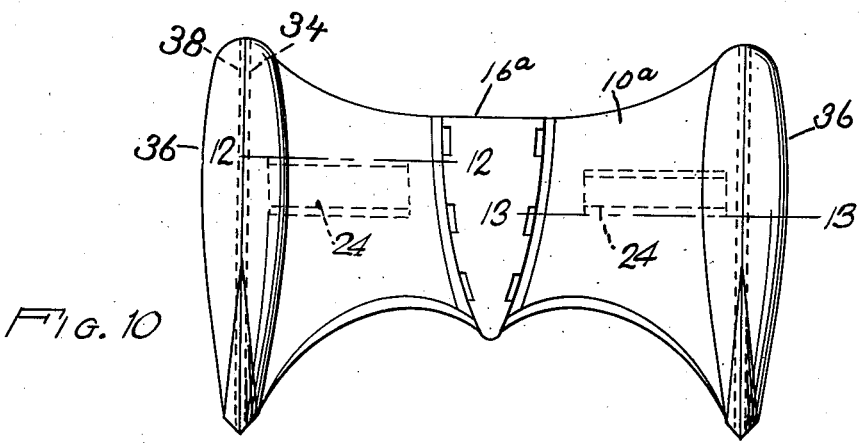
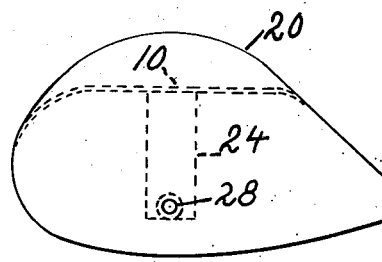
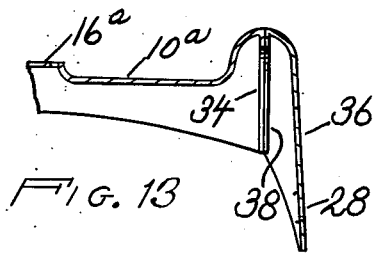
BERT J. ANDERSON
INVENTOR
BY Leon T. Hooper
ATTORNEY Patented June 22, 1937

2,084,374

UNITED STATES PATENT OFFICE 2,084,374

REAR FRAME MEMBER

Bert J. Anderson, Hammond, Ind.

Application May 22, 1935, Serial No. 22,870

26 Claims. (Cl. 208—113)

This invention relates to rear frame members for velocipede frames and has for one of its principal objects the provision of an article of the kind described which is economical to produce, of strong construction, neat and attractive in appearance and particularly adapted to give the velocipede frame with which it is associated a streamlined appearance.

Another important object of the invention resides in the provision of improved means associated with said rear frame member for supporting an axle beneath the member.

A still further important object of the invention is the provision of an improved rear frame member of the kind described which may be employed in conjunction with various types of backbones.

Further objects and advantages of the invention will become apparent as the following detailed description progresses, reference being had to the accompanying drawings, wherein—

Fig. 1 is a front elevation, partly broken away, of a rear frame member which embodies the invention.

Fig. 2 is a rear elevation of the rear frame member.

Fig. 3 is a top plan view of the rear frame member.

Fig. 4 is an end elevation of an axle supporting member forming part of the rear frame member shown in Figs. 1, 2 and 3.

Fig. 5 is a section taken on line 5—5 of Fig. 4.

Fig. 6 is an end elevation of the improved rear frame member shown in Figs. 1, 2 and 3.

Fig. 7 is a rear elevation, partly in section, of a rear frame member which embodies another form of the invention.

Fig. 8 is a rear view of one of a pair of axle supporting members forming part of the rear frame member shown in Fig. 7.

Fig. 9 is an end elevation of the axle supporting member shown in Fig. 8.

Fig. 10 is a plan view of a rear frame member embodying still another form of the invention.

Fig. 11 is a side elevation of the inner side of a fender skirt which forms a part of the rear frame member shown in Fig. 10.

Fig. 12 is a section taken on the line 12—12 of Fig. 10, and

Fig. 13 is a section taken on line 13—13 of Fig. 10.

Referring for the present to Figs. 1 to 6, inclusive, the reference numeral 10 indicates in general a stamping which comprises the preferred embodiment of the rear frame member of this invention. The stamping has downwardly turned front and rear edges, 12, and 14, respectively, to stiffen the horizontal span of the part and to add generally to the appearance of the part.

Formed of the central portion of the upper surface of the stamping 10 is a raised portion 16, which is apertured 18, as is best shown in Fig. 3, and which is adapted to provide a support for the rear end of a backbone.

In the preferred embodiment of the invention, portions of the stamping 10 near each end thereof are raised and thence curved outwardly and downwardly to form fenders 20, as is clearly shown in the drawings.

Formed on the rear central portion of each fender 20 is a rib 22, which adds greatly to the strength of the part and also enhances its appearance and tends to further set off the streamlining effect of the completed unit.

The space on the stamping 10, between the raised central portion 16 and the fenders 20, is used as a step plate and may carry any desirable design or outline, or suitable step plates may be positioned thereon.

Apertures 28 are formed in the fenders to assist in supporting an axle and to facilitate the insertion and removal of the axle. It will be apparent that the axle in position also supports the fender and prevents breakage or bending down of the part through hard usage as, for instance, a child stepping or standing on top of the fender. It will be apparent that various equivalents may be used in the association of the fender and axle for this purpose, without departing from the principle here set forth.

In the preferred construction of the rear frame member of this invention, axle supporting members 24 are secured, preferably by spot welding, to the under surface of the stamping 10, as is best shown in Figures 1 and 7.

Located near the bottom of each axle supporting member 24 is an aperture 26. It will be apparent that the apertures 26 may or may not be drawneck. And it will be further apparent that where weight may be disregarded or where it is found desirable, the upper portion of the axle supporting members may extend part way or entirely across the central portion of the stamping 10.

A modified form of the invention shown in Figures 7, 8 and 9, provides a U-shaped axle supporting member 30 which may be secured to the inside surface of the fender as well as to the under surface of the stamping, by spot welding or in any other suitable manner. The use of this modified form of axle supporting member also permits a short axle to be used in mounting the wheels in position. The member 30 is apertured 32 adjacent the lower ends thereof and when positioned within the fender 20 the aperture 26 is in alignment with the apertures 32.

A still further modification in the construction of the rear frame member of this invention is shown in Figures 10, 11, 12 and 13. In this modification the edges 34 of the stamping 10a are turned downwardly as is best shown in Figure 12 and a fender skirt 36 having correspondingly turned edges 38 is secured thereto to form an integral fender on each end of the stamping 10a as is clearly shown in Figures 10 and 13.

It will be apparent that the bracket 24 may be secured to the modified stamping 10a, as is best shown in Figure 10, without changes or alterations being made in either part.

In the modified construction of the rear frame member 10a the central portion 16a thereof is raised and apertured 18a. As in the preferred embodiment of the invention, the modified form may be used in conjunction with various types of frames without alterations or changes being made in its construction.

The fender skirt 36 is apertured 28a in order to facilitate the insertion and removal of an axle and also to provide means whereby the axle and the fender may in effect cooperatively support each other.

In the fabrication of the rear frame member of this invention, the modified form of axle supporting member 30 may be used with the preferred structure, as is best shown in Figure 7, or the member may be used with the modified stamping 10a which is shown in Figures 10, 12 and 13.

It will be apparent from the foregoing that herein is provided a rugged and sturdy article which is streamlined, well balanced and symmetrical in form and, moreover, is capable of being attached to many varieties of velocipede backbones.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A rear frame member for a velocipede comprising the combination of a pair of apertured fenders and a backbone supporting member formed from a single stamping, and apertured axle supporting means positioned beneath said stamping, the apertures in said fenders and said means being in alignment.

2. A rear frame member comprising the combination of a pair of apertured fenders and a backbone supporting member formed from a single stamping, each of said fenders being adapted to cover the upper half of a rear wheel, and means intermediate the outside vertical portions of said stamping for securing an axle adjacent the lower edge of each fender.

3. A rear frame member for a velocipede comprising the combination of a pair of apertured fenders and a backbone supporting member formed from a single stamping, and means for securing an axle adjacent the lower edge of each fender, said means comprising a U shaped apertured member secured to the inside surface of each fender.

4. In a rear frame for a velocipede comprising a stamping having a raised apertured central portion and downwardly turned apertured ends, said last named apertures being aligned and adapted to receive an axle, the downwardly turned ends of said stamping being positioned outside of and covering the rear wheels of the velocipede.

5. In a rear frame for a velocipede comprising a stamping having a raised apertured central portion and downwardly turned ends, each of said downwardly turned ends terminating a portion adapted to cover the entire upper half of a rear wheel, and means for securing an axle beneath said stamping, said means including supporting portions formed of parts of said downwardly turned ends and axle supporting members secured to the under side of said stamping.

6. In a rear frame for a velocipede comprising a stamping having a raised central portion and downwardly turned apertured ends, each downwardly turned end being adapted to encase the upper half of a wheel, the front and rear edges of said stamping being turned downwardly and spaced apart, and means formed of portions of said downwardly turned ends for supporting an axle.

7. In a rear frame for a velocipede comprising a stamping having a raised apertured central portion and downwardly turned apertured ends, said apertures being in alignment and adapted to receive an axle, and wheel receiving means intermediate said downwardly turned ends.

8. In a rear frame for a velocipede comprising a stamping having a raised central portion and downwardly turned apertured ends, said downwardly turned ends providing guards which completely cover the upper half of each rear wheel, and a plurality of apertured members positioned between said downwardly turned apertured ends, said apertures being in alignment and adapted to receive an axle.

9. In a rear frame for a velocipede comprising a stamping having downwardly turned apertured ends, and a U-shaped apertured member secured to each downwardly turned end, said apertures being in alignment and adapted to receive an axle.

10. An axle supporting member for a velocipede comprising a central portion adapted to receive portions of and be secured to a backbone, the outer portions of said supporting member being raised and then turned downwardly to form a fender on each end of said member, each fender being adapted to encase and mask the entire upper half of a wheel, and an axle receiving aperture formed adjacent the edge of each downwardly turned end.

11. An axle supporting member comprising a stamping having a central portion adapted to be secured to a backbone, the outer portions of said supporting member being raised and then turned outwardly and downwardly to form an integral fender on each end of said member, a plurality of apertured axle supporting members extending downwardly from the under surface of said supporting member, and an axle receiving opening adjacent the lower edge of each fender.

12. An axle supporting member comprising a stamping having a central portion adapted to receive and support a backbone member said axle supporting member extending outwardly from the central portion and being curved upwardly and outwardly and having the ends thereof turned downwardly and apertured, an apertured axle supporting member extending downwardly from the under surface of each upwardly and outwardly curved portion, and relatively flat deck surfaces between said central portion and said upwardly curved outer portions.

13. An axle supporting member, a stamping having a plurality of tongue receiving apertures and having an upper central surface adapted to support a backbone member, said stamping extending outwardly from the central portion and being curved upwardly and outwardly and being adapted to have the outer portion of an axle receiving fender secured thereto.

14. In an axle supporting member, an apertured stamping having a portion adjacent each end thereof bulged upwardly, each end of said stamping being apertured and turned downwardly, and apertured axle supporting means extending downwardly from the under surface of said stamping, said apertures being in alignment and adapted to receive an axle.

15. In an axle supporting member for a velocipede, said member having downwardly turned apertured ends, and an apertured U-shaped member secured to the inner surface of each downwardly turned end, said apertures being in alignment.

16. Axle supporting means adapted to be used in conjunction with an apertured rear frame member and comprising a plurality of apertured members, said members being of a formation adapted to be secured to the under surface of said rear frame member with said apertures in alignment and providing an axle supporting bearing on each side of each wheel.

17. An apertured axle supporting member adapted to be used in conjunction with a fendered rear frame member, a part of said apertured member being adapted to be secured within the fender portion of said rear frame member and extending downwardly to provide axle supporting engagement on each side of a wheel.

18. In a velocipede frame, a stamping having a raised apertured central portion, said apertures comprising a plurality of tongue receiving openings on each side of and adjacent the transverse center line of said stamping, a portion of said stamping on each side of said raised central portion extending outwardly and thence being turned upwardly, said upwardly turned portions being curved outwardly, each end of said stamping being turned downwardly, an apertured fender skirt secured to each downwardly turned end, and an apertured axle supporting member secured to the inner surface of each fender skirt.

19. In a velocipede frame, a stamping having an apertured central portion, a flat portion extending outwardly on opposed sides of said central portion, said flat portions terminating in upwardly bulged ends, the outer portions of said bulged ends being apertured adjacent the edges thereof, and an apertured axle supporting member secured within each upwardly bulged end.

20. The combination with a pair of apertured U-shaped axle supporting members, of a rear frame member for a velocipede to the under surface of which rear frame member said axle supporting members are secured, said rear frame member comprising an integral stamping having a raised central portion for attachment to a backbone, the outer portions of said stamping terminating in integral fender members.

21. The combination with a pair of apertured axle supporting members of a rear frame member for a velocipede to which rear frame member said axle supporting members are secured to provide an axle supporting bearing on each side of each wheel, said rear frame member comprising an integral stamping having a central portion adapted for attachment to a backbone, the outer portions of said stamping terminating in integral fender members.

22. The combination with a pair of apertured axle supporting members of a rear frame member for a velocipede to which rear frame member said axle supporting members are secured, said rear frame member comprising an integral stamping having in the central portion a plurality of aligned tongue receiving apertures for attachment to a backbone, and a fender skirt attached to each end of said stamping.

23. The combination with a pair of apertured axle supporting members of a rear frame member for a velocipede to which rear frame member said axle supporting members are secured, said rear frame member comprising an integral stamping having a central portion adapted for attachment to a backbone, and an apertured fender skirt secured to each end of said stamping, the apertures in the supporting members and said fender skirt being in alignment.

24. The combination with a pair of apertured axle supporting members, of a rear frame member for a velocipede to which rear frame member said axle supporting members are secured, said rear frame member comprising an integral stamping having a raised central portion for attachment to a backbone, the outer portions of said stamping terminating in integral complete fenders.

25. The combination with a pair of apertured axle supporting members, of a rear frame member for a velocipede to which rear frame member said axle supporting members ar secured, said rear frame member comprising an integral stamping having a raised central portion for attachment to a backbone, the outer portions of said stamping terminating in integral fender members, and other fender members secured to said integral fender members.

26. The combination with a pair of apertured axle supporting members, of a rear frame member for a velocipede to which rear frame member said axle supporting members are secured, said rear frame member comprising an integral stamping for attachment to a backbone, the outer portions of said stamping terminating in fenders having axle receiving apertures aligned with the apertures in said axle supporting members.

BERT J. ANDERSON.